(12) United States Patent
Baek et al.

(10) Patent No.: US 12,646,772 B2
(45) Date of Patent: Jun. 2, 2026

---

(54) METHOD AND APPARATUS FOR MANUFACTURING POUCH-TYPE SECONDARY BATTERY

(71) Applicant: LG Energy Solution, Ltd., Seoul (KR)

(72) Inventors: Ju Hwan Baek, Daejeon (KR); Jung Su Oh, Daejeon (KR); Seung Bae Lee, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 509 days.

(21) Appl. No.: 18/028,259

(22) PCT Filed: Nov. 3, 2021

(86) PCT No.: PCT/KR2021/015811
    § 371 (c)(1),
    (2) Date: Mar. 24, 2023

(87) PCT Pub. No.: WO2022/108194
    PCT Pub. Date: May 27, 2022

(65) Prior Publication Data
    US 2024/0250353 A1      Jul. 25, 2024

(30) Foreign Application Priority Data

Nov. 19, 2020      (KR) ........................ 10-2020-0156017

(51) Int. Cl.
    *H01M 50/169*          (2021.01)
    *H01M 10/04*           (2006.01)
    (Continued)

(52) U.S. Cl.
    CPC ..... *H01M 50/169* (2021.01); *H01M 10/0404* (2013.01); *H01M 50/105* (2021.01); *H01M 50/172* (2021.01); *H01M 50/543* (2021.01)

(58) Field of Classification Search
    CPC ............. H01M 50/169; H01M 50/105; H01M 50/543; H01M 50/172; H01M 10/0404;
    (Continued)

(56) References Cited

U.S. PATENT DOCUMENTS

2017/0170437 A1      6/2017   Lee et al.
2019/0393455 A1      12/2019  Seo et al.
(Continued)

FOREIGN PATENT DOCUMENTS

CN          105914389 A          8/2016
CN          206412408 U          8/2017
(Continued)

OTHER PUBLICATIONS

International Search Report for PCT/KR2021/015811 mailed Feb. 16, 2022. 3 pgs.
(Continued)

*Primary Examiner* — James D Sells
(74) *Attorney, Agent, or Firm* — Lerner David LLP

(57)                ABSTRACT

A method for manufacturing a pouch-type secondary battery according to an embodiment of the present invention may include: a first sealing operation of fusing a lead film, which is attached to an electrode lead of an electrode assembly, to a sealing portion of a pouch in which the electrode assembly is accommodated; and a second sealing operation of sealing the sealing portion of the pouch. The first sealing operation may include: a heating process of irradiating with a laser beam a region which is present in the sealing portion of the pouch and corresponds to the lead film, thereby heating the lead film and melting a resin layer of the region; and a bonding process of compressing the region, thereby bonding the lead film and the melted resin layer.

12 Claims, 7 Drawing Sheets

10

(51) Int. Cl.
H01M 50/105 (2021.01)
H01M 50/172 (2021.01)
H01M 50/543 (2021.01)

(58) Field of Classification Search
CPC ... H01M 50/183; B29C 66/1612; B29C 65/18
USPC .................................................. 156/272.8
See application file for complete search history.

(56) References Cited

U.S. PATENT DOCUMENTS

| | | | |
|---|---|---|---|
| 2020/0044229 A1 | 2/2020 | Yanagi | |
| 2020/0176725 A1 | 6/2020 | Dai et al. | |
| 2022/0088708 A1* | 3/2022 | Park | B23K 20/002 |

FOREIGN PATENT DOCUMENTS

| | | |
|---|---|---|
| CN | 107891223 A | 4/2018 |
| CN | 110379991 A | 10/2019 |
| CN | 111276751 A | 6/2020 |
| CN | 210897500 U | 6/2020 |
| EP | 0995535 B1 | 11/2005 |
| JP | H05-226322 A | 9/1993 |
| JP | 2006-009073 A | 1/2006 |
| JP | 2008-026594 A | 2/2008 |
| JP | 2009-125331 A | 6/2009 |
| JP | 2009119807 A | 6/2009 |
| JP | 2013-196930 A | 9/2013 |
| JP | 2018-156725 A | 10/2018 |
| JP | 2020-129515 A | 8/2020 |
| KR | 101082960 B1 | 11/2011 |
| KR | 20120056316 A | 6/2012 |
| KR | 20130130935 A | 12/2013 |
| KR | 101471765 B1 | 12/2014 |
| KR | 101666381 B1 | 10/2016 |
| KR | 2017-0100333 A | 9/2017 |
| KR | 20190023649 A | 3/2019 |
| KR | 20190082309 A | 7/2019 |
| KR | 102114242 B1 | 5/2020 |
| KR | 20200090498 A | 7/2020 |

OTHER PUBLICATIONS

Extended European Search Report including Written Opinion for Application No. 21894965.9 dated Apr. 3, 2024, pp. 1-8.
Search Report dated Aug. 15, 2025 from the Office Action for Chinese Application No. 202180062778.3 issued Aug. 20, 2025, 3 pages.

* cited by examiner

METHOD AND APPARATUS FOR MANUFACTURING POUCH-TYPE SECONDARY BATTERY

CROSS-REFERENCE TO RELATED APPLICATION

The present application is a national stage entry under 35 U.S.C. § 371 of International Application No. PCT/KR2021/015811, filed on Nov. 3, 2021, which claims priority to Korean Patent Application No. 10-2020-0156017, filed on Nov. 19, 2020, the disclosures of which are hereby incorporated by reference herein in their entireties.

TECHNICAL FIELD

The present invention relates to a method and apparatus for manufacturing a secondary battery and, more specifically, to a method and apparatus for manufacturing a pouch-type secondary battery.

BACKGROUND ART

Recently, the price of energy sources is increasing due to the depletion of fossil fuels, interest in environmental pollution is growing, and demands for eco-friendly alternative energy sources have become an indispensable factor for the future life. Accordingly, research on technologies for generating various powers such as photovoltaic, wind, and tidal powers is continuing, and power storage devices such as batteries for more efficiently using the generated electric energy are also drawing much attention.

Furthermore, as technical development and demands for electronic mobile devices and electric vehicles using batteries increase, demands for batteries as energy sources are rapidly increasing. Accordingly, lots of research on the batteries capable of coping with these various demands are being carried out.

In particular, in terms of materials, there are high demands for lithium secondary batteries, such as lithium ion batteries and lithium ion polymer batteries, having advantages such as the high energy density and discharge voltage and the output stability.

Depending on the shape of a battery case, secondary batteries may be classified as a cylindrical or prismatic battery in which an electrode assembly is embedded in a cylindrical or prismatic metal can and a pouch-type battery in which an electrode assembly is embedded in a pouch made of an aluminum laminate sheet.

FIG. 1 is a perspective view illustrating an example of a pouch-type secondary battery.

Referring to FIG. 1, a pouch-type secondary battery 10 may include an electrode assembly 30 in which a plurality of electrodes and separators are alternately stacked and a pouch 20 which accommodates the electrode assembly 30. The electrode assembly 30 may be provided with a plurality of tab 31 which extend from the plurality of electrodes and are fused to each other and an electrode lead 32 which is bonded to the plurality of tabs 31 fused to each other. The electrode lead 32 may protrude outward from the pouch 20 and may be easily electrically connected to a power supply target (e.g., a motor or the like).

The pouch 20 may include: a pouch body 21 having an accommodation portion 23 which has a recessed shape and to which the electrode assembly 30 is mounted; and a pouch cover 22 bonded to the pouch body 21 to seal the accommodation portion 23. Before the electrode assembly 30 is accommodated, the pouch body 21 and the pouch cover 22 may be integrally connected to or separated from each other. Also, it is possible that a sub accommodation portion (not shown) that has a recessed shape corresponding to the accommodation portion 23 is formed in the pouch cover 22.

Also, the pouch body 21 may include a facing surface 24 that is positioned in the outside of the accommodation portion 23 and faces the pouch cover 22, and at least a portion of the facing surface 24 may be bonded to the pouch cover 22 by thermal fusion. That is, a sealing portion of the pouch 20 may be sealed as at least a portion of the facing surface 24 is bonded to the pouch cover 22.

A lead film 40 may be attached to each of both surfaces of the electrode lead 32 not only to prevent a short circuit from occurring in the electrode lead 32 while the sealing portion of the pouch 20 is sealed, but also to ensure sealing between the electrode lead 32 and the pouch 20. Thus, a region, which is present in a sealing portion of the pouch 20 and adjacent to the lead film 40, may have a complicated shape when compared to the other regions and may have different thickness. Accordingly, in a manufacturing method according to the related art, in which a sealing portion of the pouch 20 is compressed and sealed by a heating bar, it is difficult to ensure uniform sealing quality, and a time required to seal is lengthened.

Also, the manufacturing method according to the related art includes heating the electrode lead 32 prior to sealing the sealing portion of the pouch 20. This is to prevent heat of the heating bar, which seals the sealing portion of the pouch 20, from being conducted to a cold electrode lead 32. However, a separate lead heater is required due to the above reason, and accordingly, costs of a manufacturing apparatus is increased, and temperature control becomes complicated.

Patent document KR 10-2012-0056316 A (published on Jun. 4, 2012) can be cited as a prior art document.

DISCLOSURE OF THE INVENTION

Technical Problem

An object of the present invention for solving the above problems is to provide a method and apparatus for manufacturing a pouch-type secondary battery, which can reduce a sealing time and enhance sealing quality.

Technical Solution

A method for manufacturing a pouch-type secondary battery of the present invention includes: a first sealing operation of irradiating with a laser beam a region which is present in a sealing portion of a pouch and corresponds to a lead film and compressing the same; and a second sealing operation of sealing the sealing portion of the pouch.

In more detail, a method for manufacturing a pouch-type secondary battery according to an embodiment of the present invention may include: a first sealing operation of fusing a lead film, which is attached to an electrode lead of an electrode assembly, to a sealing portion of a pouch in which the electrode assembly is accommodated; and a second sealing operation of sealing the sealing portion of the pouch. The first sealing operation may include: a heating process of irradiating with a laser beam a region which is present in the sealing portion of the pouch and corresponds to the lead film, thereby heating the lead film and melting a resin layer of the region; and a bonding process of compressing the region, thereby bonding the lead film and the melted resin layer.

The first sealing operation and the second sealing operation may be sequentially conducted.

The region sealed in the first sealing operation may be included in the sealing portion sealed in the second sealing operation.

A length of the region with respect to a width direction of the lead film may be greater than or equal to a width of the lead film.

The heating process and the bonding process may be simultaneously performed.

The laser beam may be an infrared laser beam having a wavelength of 808 nm to 980 nm.

A laser unit performing the first sealing operation may include: a light source configured to emit a laser beam; and a compression part compressing the region which is present in the sealing portion of the pouch and corresponds to the lead film, the compression part having a transparent or translucent material through which the laser beam is transmitted.

The light source may emit the laser beam in a state in which the compression part compresses the region.

The sealing tool may include a heating bar that compresses the sealing portion. A temperature of the compression part when the region is compressed may be lower than a temperature of the heating bar when the sealing portion is compressed.

The region sealed in the first sealing operation may be excluded from the sealing portion sealed in the second sealing operation.

An apparatus for manufacturing a pouch-type secondary battery according to an embodiment of the present invention may include: a laser unit configured to fuse a lead film, which is attached to an electrode lead of an electrode assembly, to a sealing portion of a pouch in which the electrode assembly is accommodated; and a sealing tool configured to seal the sealing portion of the pouch after the lead film is fused to the sealing portion. The laser unit may include: a light source configured to emit a laser beam; and a compression part configured to compress a region which is present in the sealing portion of the pouch and corresponds to the lead film, the compression part having a transparent or translucent material through which the laser beam is transmitted.

The apparatus may further include an optical part configured to guide the laser beam, which is emitted from the light source, to the compression part.

The compression part may have a quartz material.

The compression part may refract or reflect the laser beam emitted from the light source.

Advantageous Effects

According to a preferred embodiment of the present invention, a first sealing operation may be provided, in which a region, which is present in a sealing portion of a pouch and corresponds to a lead film, is irradiated with a laser beam and compressed. Accordingly, compared to a sealing method according to the related art, sealing quality in a region near a lead film having a complicated shape may be enhanced, and the time consumed in sealing may be reduced.

Also, only the region describe above is irradiated by a laser beam. Thus, a laser unit has a compact size, and equipment costs are reduced.

Also, the irradiation time and intensity of the laser beam may be adjusted. Thus, a separate lead heater for pre-heating the electrode lead is not necessary.

Also, when a second sealing operation seals regions including the above-described region, the sealing of the region is more strengthened.

Also, when the second sealing operation seals regions excluding the above-described region, the sealing quality of the region is maintained high.

Also, a length of the region with respect to a width direction of the lead film may be greater than or equal to a width of the lead film. Accordingly, the lead film may be reliably thermally fused to the sealing portion.

Also, a heating process and a bonding process of the first sealing operation may be simultaneously performed. Accordingly, a resin melted in the heating process may be reliably thermally fused to the lead film.

Also, a compression part of the laser unit may compress the region and also allow the laser beam to be transmitted therethrough. Also, the compression part itself may serve as an optical part. Accordingly, the configuration of the laser unit becomes simple and compact.

Also, the compression part may include a quartz material. Accordingly, the compression part may sufficiently firmly compress the region while allowing the laser beam to be transmitted therethrough.

MODE FOR CARRYING OUT THE INVENTION

Figure 1:
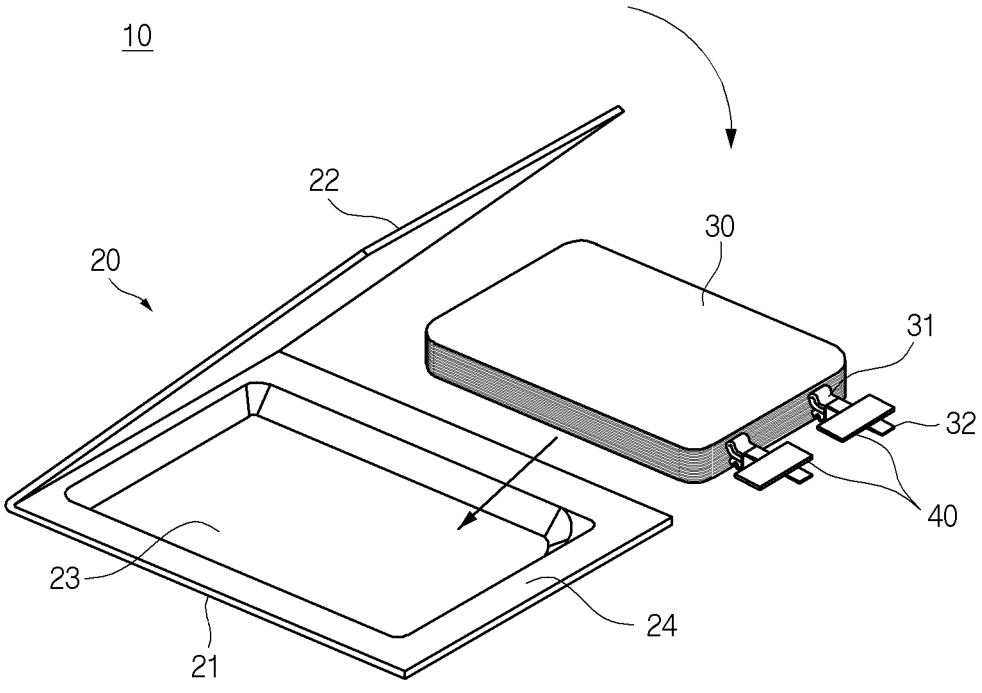
FIG. 1 is a perspective view illustrating an example of a pouch-type secondary battery.

Hereinafter, preferred embodiments of the present invention will be described in detail with reference to the accompanying drawings so as to be easily carried out by a person skilled in the art to which the present invention pertains. However, the present invention may be embodied in various different forms, and is neither limited nor restricted to the following embodiments.

In order to clearly describe the present invention, parts irrelevant to the description are omitted, and descriptions related to well-known functions or configurations are ruled out so as not to unnecessarily obscure subject matters of the present invention. In the specification, when reference numerals are given to components in each of the drawings, the same or similar components will be designated by the same or similar reference numerals throughout the specification.

Also, terms or words used in this specification and claims should not be restrictively interpreted as ordinary meanings or dictionary-based meanings, but should be interpreted as meanings and concepts conforming to the technical ideas of the present invention on the basis of the principle that an inventor can properly define the concept of a term to describe his or her invention in the best ways.

Figure 2:
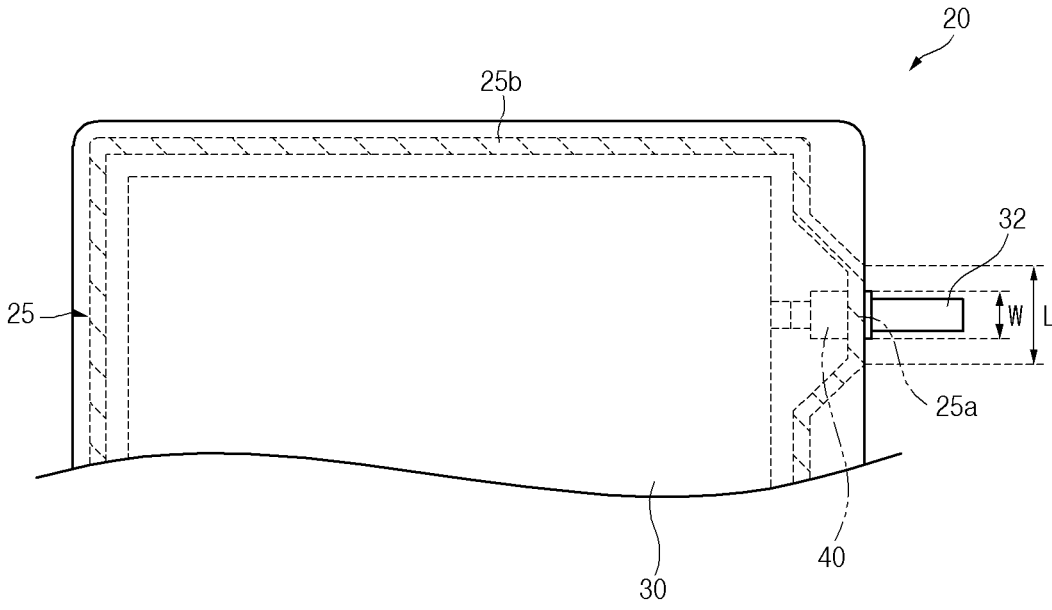
FIG. 2 is a plan view of a pouch-type secondary battery which is formed according to a method for manufacturing a pouch-type secondary battery according to the present invention.

FIG. 2 is a plan view of a pouch-type secondary battery which is formed according to a method for manufacturing a pouch-type secondary battery according to an embodiment of the present invention.

Referring to FIGS. 1 and 2, a pouch 20 may include a sealing portion 25. The sealing portion 25 may form a closed loop that extends along the circumferential direction of the pouch 20.

When sealing of the pouch 20 is completed, the sealing portion 25 may represent a portion sealed in the pouch 20. Also, before sealing of the pouch 20 is completed, the sealing portion 25 may represent a portion to be sealed in each of a pouch body 21 and a pouch cover 22.

In more detail, the sealing portion 25 may include a first region 25a corresponding to a lead film 40 and a second region 25b except for the first region 25a. The first region 25a and the second region 25b may be sealed through different methods, and this will be described later in detail.

The second region 25b may be sealed by thermally fusing a facing surface 24 of the pouch body 21 and the pouch cover 22.

The first region 25a may be sealed by thermal fusion with the lead film 40. In more detail, a lead film 40 attached to one surface of an electrode lead 32 may be thermally fused to the pouch cover 22, and a lead film 40 attached to the other surface of the electrode lead 32 may be thermally fused to the facing surface 24 of the pouch body 21.

A length L of the first region 25a with respect to the width direction of the lead film 40 may be greater than or equal to a width W of the lead film 40. That is, the first region 25a may include not only a region directly facing the lead film 40 but also a region adjacent thereto.

In more detail, when the length L of the first region 25a is equal to the width W of the lead film 40, the entire first region 25a may be thermally fused to the lead film 40 and sealed. On the other hand, when the length L of the first region 25a is greater than the width W of the lead film 40, ends of the first region 25a out of the lead film 40 may be sealed as the facing surface 24 of the pouch body 21 is thermally fused with the pouch cover 22.

Figure 3:
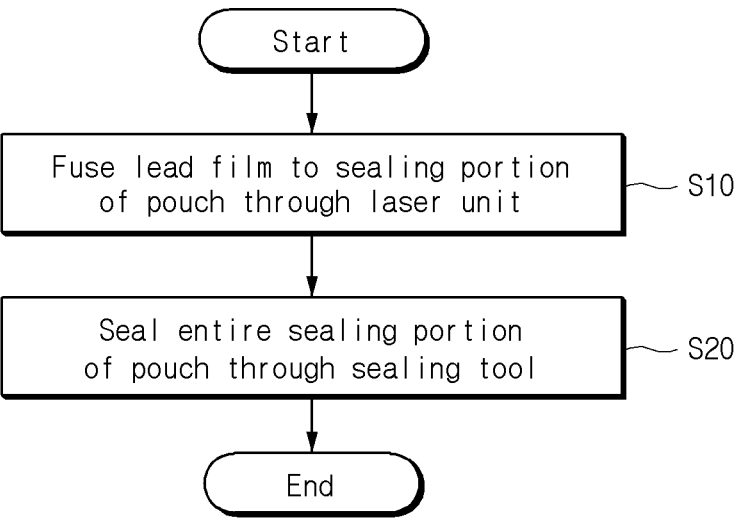
FIG. 3 is a flowchart illustrating a method for manufacturing a pouch-type secondary battery according to an embodiment of the present invention.

FIG. 3 is a flowchart illustrating a method for manufacturing a pouch-type secondary battery according to an embodiment of the present invention.

Referring to FIG. 3, the method for manufacturing a pouch-type secondary battery according to the embodiment may include a first sealing operation (S10) of fusing a lead film 40 to a sealing portion 25 of a pouch 20 through a laser beam and a second sealing operation (S20) of sealing the sealing portion 25 of the pouch 20.

The first sealing operation (S10) may be pre-sealing, and the second sealing operation (S20) may be main-sealing. That is, the first sealing operation (S10) and the second sealing operation (S20) may be sequentially conducted.

The first sealing operation (S10) and the second sealing operation 20 may be conducted in different stages, and an operation of injecting an electrolyte into an accommodation portion 23 of the pouch 20 may be conducted between the first sealing operation (S10) and the second sealing operation (S20).

In more detail, the first sealing operation (S10) may thermally fuse a first region 25a and the lead film 40. The first sealing operation (S10) may be performed by a laser unit 60 (see FIG. 5) which will be described later.

In more detail, the first sealing operation (S10) may include: a heating process of irradiating with a laser beam the first region 25a which is present in the sealing portion 25 of the pouch 20 and corresponds to the lead film 40, thereby heating the lead film 40 and melting resin layers 21c and 22c (see FIG. 4) of the first region 25a; and a bonding process of compressing the first region 25a, thereby bonding the lead film 40 and the melted resin layers 21c and 22c. This will be described later in detail.

The second sealing operation (S20) may seal the entire sealing portion 25, that is, both the first region 25a and a second region 25b. The second sealing operation (S20) may be performed in a different way from the first sealing operation (S10). The second sealing operation (S20) may be performed by a sealing tool 50 (see FIG. 4) which will be described later.

Figure 4:
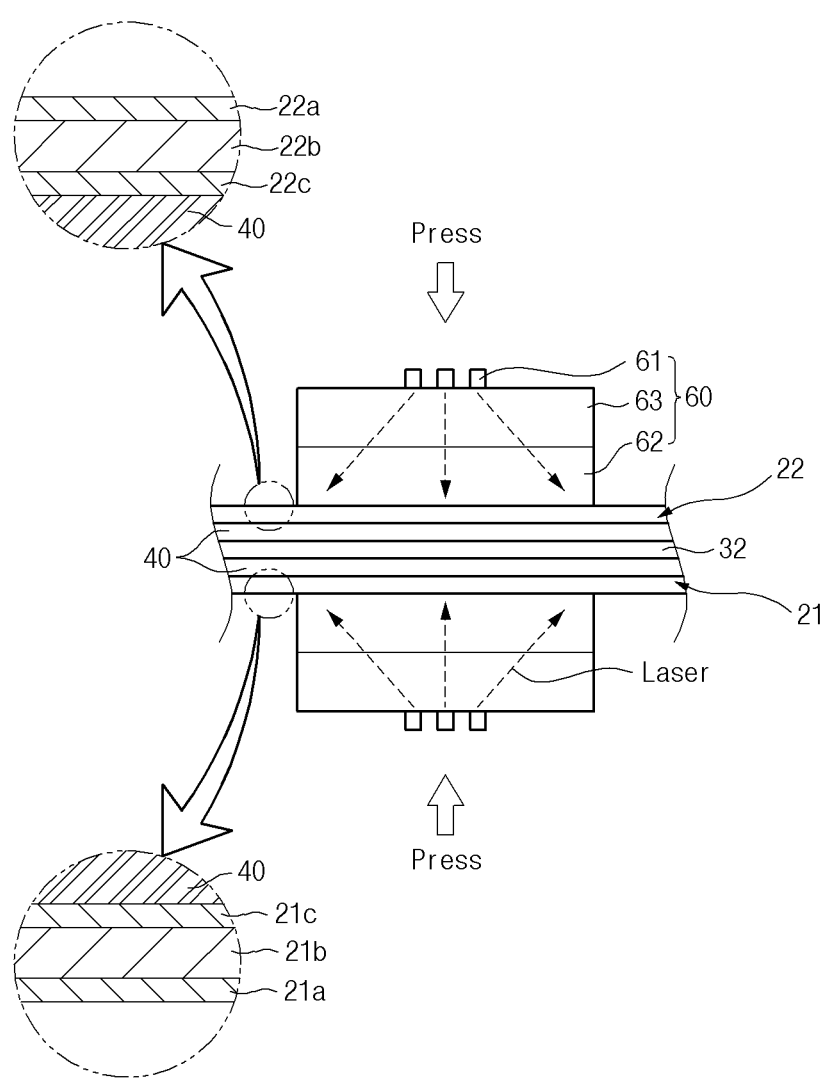
FIG. 4 is a schematic view illustrating an example of a laser unit for performing a first sealing operation.

FIG. 4 is a schematic view illustrating an example of a laser unit for performing a first sealing operation.

An apparatus for manufacturing a pouch-type secondary battery according to an embodiment of the present invention (hereinafter, referred to as a 'manufacturing apparatus') may include the laser unit 60 that performs the first sealing operation (S10). The laser unit 60 may fuse the lead film 40 to the sealing portion 25 of the pouch 20, more specifically, to the first region 25a.

A pouch body 21 and a pouch cover 22, which constitute the pouch 20, may be made of laminate sheets that include inner resin layers 21c and 22c, respectively. In more detail, the pouch body 21 and the pouch cover 22 may respectively include: outer resin layers 21a and 22a constituting a portion of the exterior of the pouch 20; inner resin layers 21c and 22c for sealing; and metal layers 21b and 22b positioned between the outer resin layers 21a and 22a and the inner resin layers 21c and 22c. For example, the outer resin layers 21a and 22a may include polyethylene terephthalate (PET) materials, the metal layers 21b and 22b may include aluminium (AL) materials, and the inner resin layers 21c and 22c may include polypropylene (PP) materials.

The laser unit 60 may irradiate with the laser beam the first region 25a of the sealing portion 25 of the pouch 20, and may compress the first region 25b. Thus, the inner resin layers 21c and 22c of the first region 25a of the pouch 20 may be melted and thermally fused to the lead film 40. Also, the lead film 40 also has a resin material (e.g., polypropylene), and thus, a portion of the lead film 40 may be melted by the laser beam emitted from the laser unit 60. Thus, the thermal fusion between the lead film 40 and the inner resin layers 21c and 22c may be more reliably made.

In more detail, the laser unit 60 may include a light source 61, a compression part 62, and an optical part 63.

The light source 61 may emit laser having a beam shape. For example, the light source 61 may be a laser diode. The laser beam emitted from the light source 61 may be an infrared laser beam, and more specifically, an infrared laser beam having a wavelength of 808 nm to 980 nm.

The light source 61 may be provided in plurality. Some of the plurality of light sources 61 may be positioned above the pouch 20 and referred to as upper light sources, and the others of the plurality of light sources 61 may be positioned below the sealing portion 25 and referred to as lower light sources.

The laser beams emitted from the upper light sources 61 may heat the lead film 40 attached to the upper side of the electrode lead 32 and the first region 25a of the pouch cover 22. The laser beams emitted from the lower light sources 61 may heat the lead film 40 attached to the lower side of the electrode lead 32 and the first region 25*a* of the pouch body 21.

The compression part 62 may compress the first region 25*a*. The compression part 62 may have a transparent or translucent material through which the laser beam emitted from the light source transmitted. For example, the compression part 62 may include a quartz material having high strength. Accordingly, the compression part 62 may allow the laser beam to be transmitted therethrough while sufficiently firmly compressing the first region 25*a*.

The temperature of the compression part 62 of the laser unit 60 when compressing the first region 25*a* may be lower than the temperature of a heating bar 50 that compresses the sealing portion 25 during the second sealing operation. This is because the laser beam emitted from the light source 61 is transmitted through the compression part 62, as opposed to heating the same. Thus, energy loss may be reduced.

A pair of compression parts 62 may be provided. The pair of compression parts 62 facing each other with the first region 25*a* therebetween may move in directions to become closer to each other and compress the first region 25*a*. It is that the manufacturing apparatus includes a apparent raising/lowering mechanism that raises and lowers the compression parts 62.

FIG. 4 illustrates that the light source 61 and the optical part 63 move together with the compression parts 62, but this is not limited thereto. It is possible for the compression parts 62 to move solely.

In more detail, a compression part 62 positioned above the pouch 20 may compress downward the first region 25*a* of the pouch cover 22 and may be referred to as an upper compression part. A compression part 62 positioned below the pouch 20 may compress upward the first region 25*a* of the pouch body 21 and may be referred to as a lower compression part.

The laser beams emitted from the upper light source 61 may pass through the upper compression part 62 and then thermally fuse the lead film 40 attached to the upper side of the electrode lead 32 and the inner resin layer 22*c* of the pouch cover 22. The laser beams emitted from the lower light source may pass through the upper compression part and then thermally fuse the lead film 40 attached to the lower side of the electrode lead 32 and the inner resin layer 21*c* of the pouch body 21.

The optical part 63 may be positioned between the light source 61 and the compression part 62 along the path of the laser beams. The optical part 63 may refract and/or reflect the laser beam emitted from the light source 61 and guide the same to the compression part 62. For example, the optical part 63 may include at least one of a lens and a reflector. The optical part 63 may be formed integrally with the compression part 62 or may be provided as a separate member. Like the compression parts 62, at least a pair of optical parts 63 may be provided.

The laser beams emitted from the light source 61 may be superposed with each other after passing through the optical part 63 and the compression part 62, and may be simultaneously emitted to the entire region which is present in the pouch body 21 and compressed by the compression part 62. Also, the region may be heated from 200 degrees Celsius to 250 degrees by the laser beam.

Hereinafter, an operation of the laser unit 60 during the first sealing operation (S10) will be described in detail.

The first sealing operation (S10) may be initiated in a state in which the pouch 20 is aligned so that the first region 25*a* of the sealing portion 25 is positioned between the at least one pair of the compression parts 62.

The first sealing operation (S10) may include: a heating process of irradiating the first region 25*a* of the sealing portion 25 with the laser beam to heat the lead film 40, thereby melting the inner resin layers 21*c* and 22*c* of the first region 25*a*; and a bonding process of compressing the first region 25*a*, thereby bonding the lead film 40 and the melted resin layers 21*c* and 22*c*.

The heating process may be performed, as the laser beam emitted from the light source 61 is guided to the compression part 62 by the optical part 63, transmitted through the compression part 62, and then emitted to the first region 25*a*. The inner resin layers 21*c* and 22*c* of the first region 25*a* may be melted by the laser beam emitted to the first region 25*a*.

Also, since the irradiation time or intensity of the laser beam may be adjusted, the inner resin layers 21*c* and 22*c* of the first region 25*a* may be reliably melted even if the electrode lead 32 is in a cold state. Thus, since the electrode lead 32 does not need to be pre-heated, a separate lead heater (not shown) is not necessary.

The bonding process may be performed as the compression part 62 compresses the first region 25*a*. In more detail, the pair of compression parts 62 facing each other may move in directions to become closer to each other and compress the first region 25*a*. Thus, the inner resin layers 21*c* and 22*c* of the first region 25*a* melted by the heating process may be bonded to the lead film 40.

Since the first region 25*a* is irradiated with the laser beam in a compressed state, the heating process and the bonding process may be simultaneously performed. That is, the light source 61 may emit the laser beam in a state in which the compression parts 62 compress the first region 25*a*.

Figure 5:
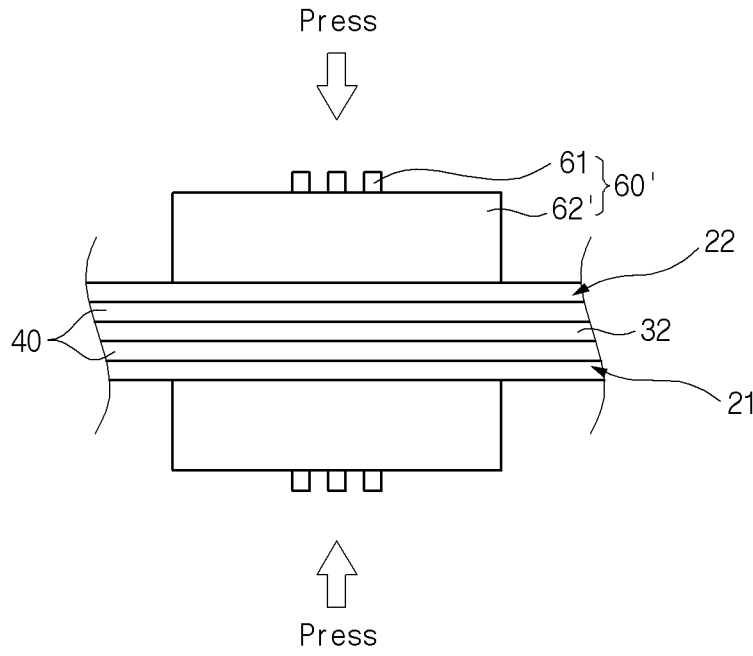
FIG. 5 is a schematic view illustrating another example of a laser unit for performing a first sealing operation.

FIG. 5 is a schematic view illustrating another example of a laser unit for performing a first sealing operation.

A laser unit 60' according to the embodiment does not include a separate optical part, and a compression part 62' may serve as an optical part. For example, the compression part 62' itself may function as a reflector or a lens. Thus, a light source 61 may directly emit a laser beam toward the compression part 62', and the laser beam may be refracted or reflected within the compression part 62' and then emitted to a first region 25*a*. Accordingly, the laser unit 60' has a compact size, and the structure thereof is simplified.

Figure 6:
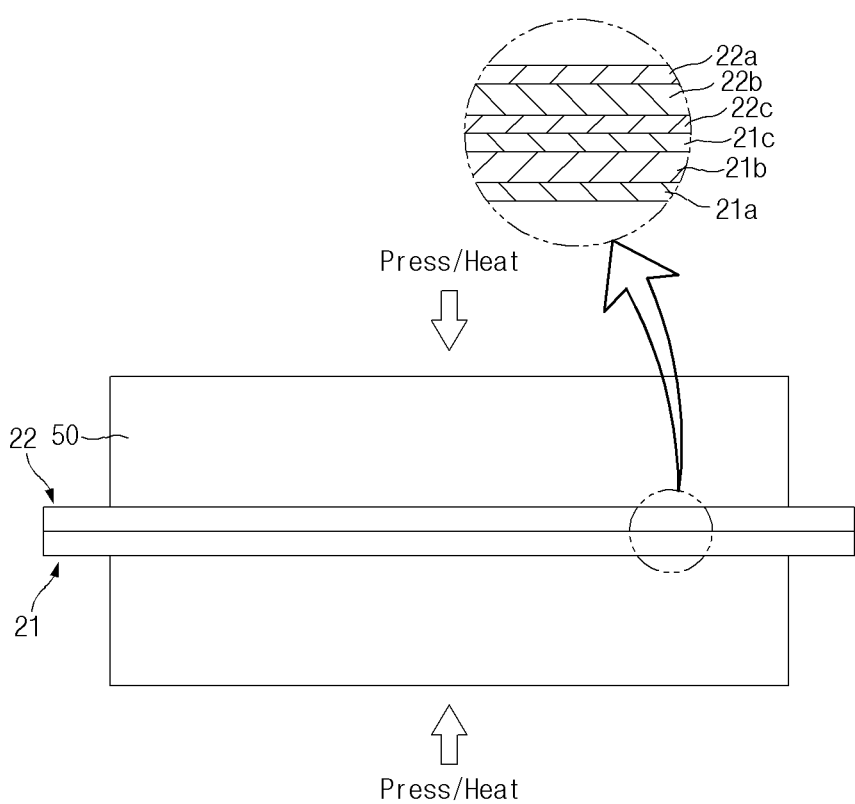
FIG. 6 is a schematic view illustrating a sealing tool for performing a second sealing operation.

FIG. 6 is a schematic view illustrating a sealing tool for performing a second sealing operation.

An apparatus for manufacturing a pouch-type secondary battery according to an embodiment of the present invention (hereinafter, referred to as a 'manufacturing apparatus') may include a sealing tool 50 that performs the second sealing operation (S20). The sealing tool 50 may seal a sealing portion 25 by thermally fusing a pouch body 21 and a pouch cover 22.

The sealing tool 50 may include at least a pair of heating bars 50 which are disposed facing each other with a pouch 20 therebetween (for convenience, the same reference numeral '50' is used for the sealing tool and the heating bars). It is apparent that the sealing tool 50 includes a heater for heating a heating bar 50 and a raising/lowering mechanism for raising and lowering the heating bar 50.

At least the pair of the heating bars 50 in a heated state may move in directions to become closer to each other and compress the sealing portion 25 of the pouch 20. Thus, an inner resin layer 21*c* of the sealing portion 25 of the pouch body 21 and an inner resin layer 22c of the sealing portion 25 of the pouch cover 22 may be melted and thermally fused to each other.

The heating bars 50 may compress the first region 25a as well as a second region 25b together.

Figure 7:
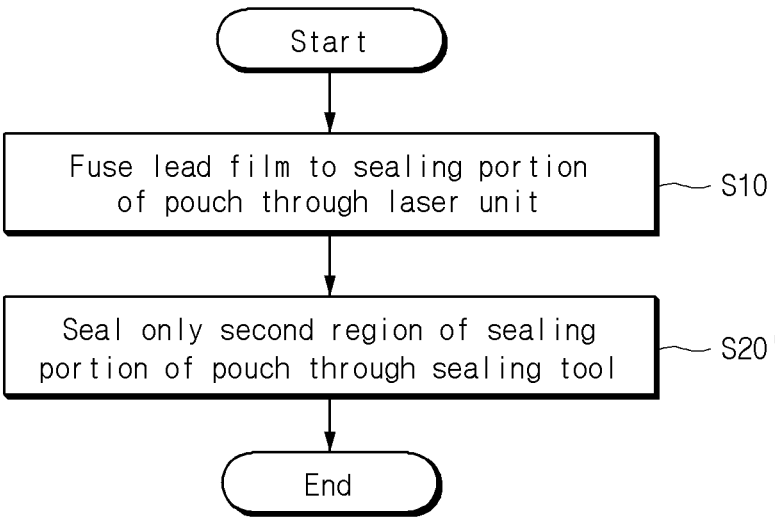
FIG. 7 is a flowchart illustrating a method for manufacturing a pouch-type secondary battery according to another embodiment of the present invention.

FIG. 7 is a flowchart illustrating a method for manufacturing a pouch-type secondary battery according to another embodiment of the present invention.

In the embodiment, a first sealing operation (S10) is identical to the first sealing operation (S10) of the above-described embodiment, and thus, the description thereof may be applied thereto.

Referring to FIG. 7, a second sealing operation (S20') according to the embodiment may seal only a second region 25b of a sealing portion 25 of a pouch 20 except for a first region 25a. That is, a heating bar 50 may compress only the second region 25b except for the first region 25a.

Accordingly, inner resin layers 21c and 22c of the first region 25a, which have been sealed by a laser unit 60, are prevented from being melted again or deformed, and thus, the sealing quality of the first region 25a may be maintained high.

Also, FIG. 7 illustrates that the first sealing operation (S10) and the second sealing operation (S20) are performed in this order, but the embodiment is not limited thereto. The first sealing operation (S10) may be performed after the second sealing operation (S20').

The technical ideas of the present invention have been described merely for illustrative purposes, and those skilled in the art will appreciate that various changes and modifications are possible without departing from the essential features of the present invention.

Thus, the embodiments of the present invention are to be considered illustrative and not restrictive, and the technical spirit of the present invention is not limited to the foregoing embodiments.

The protective scope of the present invention is defined by the appended claims, and all technical ideas within their equivalents should be interpreted as being included in the scope of the present invention.

[Description of the Symbols]

| | |
|---|---|
| 10: Pouch-type secondary battery | 20: Pouch |
| 21: Pouch body | 22: Pouch cover |
| 23: Accommodation portion | 24: Facing surface |
| 25: Sealing portion | 25a: First region |
| 25b: Second region | 30: Electrode assembly |
| 31: Tab | 32: Electrode lead |
| 40: Lead film | 50: Sealing tool |
| 60: Laser unit | 61: Light source |
| 62: Compression part | 63: Optical part |

The invention claimed is:

1. A method for manufacturing a secondary battery, the method comprising:
a first sealing operation of fusing a lead film to a sealing portion of a pouch accommodating an electrode assembly therein, the lead film being attached to an electrode lead of the electrode assembly; and
a second sealing operation of sealing the sealing portion of the pouch,
wherein the first sealing operation comprises:
a heating process of irradiating with a laser beam a region of the sealing portion of the pouch adjacent to the lead film, thereby heating the lead film and melting a resin layer of the region of the sealing portion; and
a bonding process of compressing the region of the sealing portion, thereby bonding the lead film and the melted resin layer to one another,
wherein the first sealing operation and the second sealing operation are sequentially conducted.

2. The method of claim 1, wherein the region of the sealing portion sealed during the first sealing operation is also sealed during the second sealing operation.

3. The method of claim 1, wherein a length of the region of the sealing portion in a width direction of the lead film is greater than or equal to a width of the lead film in the width direction.

4. The method of claim 1, wherein the laser beam is an infrared laser beam having a wavelength of 808 nm to 980 nm.

5. The method of claim 1, wherein the first sealing operation is performed by a laser unit, and the laser unit comprises:
a light source that emits the laser beam; and
a compression part that performs the compressing of the region of the sealing portion of the pouch adjacent to the lead film, the compression part having a transparent or translucent material through which the laser beam is transmitted.

6. The method of claim 5, wherein the light source emits the laser beam while the compression part compresses the region of the sealing portion.

7. The method of claim 5, wherein the second sealing operation is performed by a sealing tool comprising a heating bar that compresses the sealing portion, and a temperature of the compression part during the first sealing operation is lower than a temperature of the heating bar during the second sealing operation.

8. The method of claim 1, wherein the region of the sealing portion that is sealed during the first sealing operation is excluded from the sealing portion that is sealed during the second sealing operation.

9. An apparatus for manufacturing a secondary battery, the apparatus comprising:
a laser unit configured to fuse a lead film to a sealing portion of a pouch accommodating an electrode assembly therein, the lead film being attached to an electrode lead of the electrode assembly; and
a sealing tool configured to seal the sealing portion of the pouch after the lead film is fused to the sealing portion,
wherein the laser unit comprises:
a light source configured to emit a laser beam; and
a compression part configured to compress a region of the sealing portion of the pouch adjacent to the lead film, the compression part having a transparent or translucent material configured to receive transmission of the laser beam therethrough.

10. The apparatus of claim 9, further comprising an optical part configured to guide the laser beam from the light source to the compression part.

11. The apparatus of claim 9, wherein the compression part includes a quartz material.

12. The apparatus of claim 9, wherein the compression part is configured to refract or reflect the laser beam emitted from the light source.

* * * * *